(12) United States Patent
Korpela

(10) Patent No.: US 6,311,054 B1
(45) Date of Patent: Oct. 30, 2001

(54) METHOD TO DETERMINE CHARGING INFORMATION IN A MOBILE TELECOMMUNICATIONS SYSTEM AND A MOBILE STATION

(75) Inventor: Mikko Korpela, Raahe (FI)

(73) Assignee: Nokia Mobile Phones, Limited, Espoo (FI)

( * ) Notice: Subject to any disclaimer, the term of this patent is extended or adjusted under 35 U.S.C. 154(b) by 0 days.

(21) Appl. No.: 09/293,140

(22) Filed: Apr. 16, 1999

(30) Foreign Application Priority Data

Apr. 17, 1998 (FI) ........................................................ 980857

(51) Int. Cl.⁷ ........................ H04M 15/00; G01R 31/08; G06F 17/60; G06F 17/00
(52) U.S. Cl. ........................ 455/406; 455/408; 455/405; 370/238; 379/114; 705/400; 705/52
(58) Field of Search ..................................... 455/406, 407, 455/408, 405; 370/238, 352, 401, 353, 389, 252; 379/114; 705/52, 53, 400

(56) References Cited

U.S. PATENT DOCUMENTS

| 5,109,401 | 4/1992 | Hattori et al. ........................... 379/58 |
| 5,303,297 | * 4/1994 | Hillis ................................. 455/406 X |
| 5,508,999 | * 4/1996 | Cox, Jr. et al. ..................... 370/238 X |
| 5,828,737 | * 10/1998 | Sawyer .............................. 455/408 X |
| 6,137,869 | * 10/2000 | Voit et al. ............................. 379/114 |
| 6,148,191 | * 11/2000 | Kim ..................................... 455/407 |
| 6,199,054 | * 6/2001 | Khan et al. .......................... 705/400 |

FOREIGN PATENT DOCUMENTS

| 0 426 269 A1 | 5/1991 | (EP) . |
| WO 96/24229 | 8/1996 | (WO) . |
| WO 97/26739 | 7/1997 | (WO) . |

OTHER PUBLICATIONS

Finnish Office Action.

* cited by examiner

Primary Examiner—Tracy Legree
(74) Attorney, Agent, or Firm—Perman & Green, LLP

(57) ABSTRACT

A method and system to determine charging information in a mobile communications system comprising one or more mobile stations and a mobile telecommunications network wherein the system collects information about the transferred amount of data in a mobile station or in the mobile telecommunications network, which collection can be made separately concerning the transmitted and/or the received data and along with information about the call duration determined in a mobile station. The collection may also include the bearer type and the symmetry of the connection. The transferred data is classified, and the charging information is stored relating to each call or to each class. The information can be displayed to the user on the display of the mobile station.

14 Claims, 3 Drawing Sheets

METHOD TO DETERMINE CHARGING INFORMATION IN A MOBILE TELECOMMUNICATIONS SYSTEM AND A MOBILE STATION

The object of the invention is a method defined in the preamble of claim 1 for determining charging information in a mobile telecommunications system, and a mobile station defined in the preamble of claim 12.

Call duration monitoring is previously known in advanced mobile stations. In present systems the call duration is the basis for the charging. Generally the bill is addressed to the caller, but in a call transfer situation also to the transferring party. There is also a known extreme arrangement where the caller pays only a low standard call charge, and the recipient pays the rest of the charges.

There are also known international calls, for which the charges are addressed to the caller in his own country, and the charges are divided between the (roaming) parties which participate in the call establishment. The charged amount is based on time metering according to an agreement.

One problem in the known methods is that the charging is based only on time, even if the transmission is not continuous, for instance in data transmission applications.

The object of the invention is to obviate the above mentioned disadvantages.

The method according to the invention is characterized in what is stated in claim 1. The device according to the invention is characterized in what is stated in claim 12. Preferred embodiments of the invention are presented in the dependent claims.

The invention relates to a method for determining charging information in a mobile telecommunications system comprising one or more mobile stations and a mobile telecommunications network. According to the invention information is collected about the amount of transferred payload data, in order to determine a bill which is proportional to the transferred amount of payload data.

In one embodiment of the invention the bill is determined on the basis of at least one of the following parameters: the bearer type, the quality of service (QoS), the core network, and the radio access network. Thus the use of different transmission services causes bills of different levels to be determined.

In one embodiment of the invention the bill is determined as a function of at least one of the following parameters: a handover to a base station in a different core network, and a handover to a base station in a different radio access network. A change of the core network or of the radio access network causes the bill to be determined at a different level.

In one embodiment of the invention the information is collected in the mobile station. In this way the information is directly available, for instance to be displayed to the user.

In one embodiment of the invention the information is collected in the mobile telecommunications network. The network has more calculation capacity, so this does not consume processor capacity in the mobile station.

In one embodiment of the invention information is collected separately about the transmitted and/or the received payload data. Different charges can be specified for data transmission in different directions.

In one embodiment of the invention information is also collected about the call duration. In a combination of the present system based on the call duration and of the new system, the charging is preferably determined on the basis of both systems.

In one embodiment of the invention the transferred payload data is classified in classes having different characteristics. The connections are preferably classified as real-time (RT) and non real-time (NRT) connections. Further, the bit error rate (BER), the allowed maximum transmission delay, and the forward error correction (FEC), and the automatic repeat request (ARQ) of the connection are us as classification criteria. The high quality requirements of these criteria cause extra costs to the service provider in the form of a reduced total transmission capacity. Preferably the classes also have a charging proportional to the quality of the respective connection and the capacity required to establish the connection.

In one embodiment of the invention the charging information is stored relating to each call. Thus it is possible to monitor also the costs of a single call.

In one embodiment of the invention the charging information is stored by classes. Different classes are for instance the subscriber type and/or the quality class of the connection. Thus it is possible to compare the charging shares of different call classes and to save the use of memory.

In one embodiment of the invention the charging information can be displayed to the user on the display of the mobile station. In this way the user can actively participate in how his telephone bill is determined, and the magnitude of the bill will not be a surprise to him.

The invention relates also to a mobile station which collects charging information. According to the invention the mobile station includes a transmitter and a receiver for transferring information, a payload data counter for counting the charging information about the data transferred by the transmitter or the receiver, a processor for collecting the charging information on the basis of the measurement information provided by the payload data counter, and a memory for storing the charging information and the program of the processor.

In one embodiment of the mobile station it also includes a time counter for determining the call duration. In addition to the method according to the invention this enables conventional call charging monitoring.

An advantage of the invention is that the user obtains information about the transferred amount of real-time data and non real-time data, and that he is able to estimate the magnitude of the telephone bill based on the transferred amount of data.

A further advantage of the invention is that memory capacity can be saved by using for instance registering by classes based on the caller type and/or on the quality class instead of registering single calls.

The invention is described in detail below with reference to the enclosed drawing, in which FIG. 1 shows in a flow diagram the steps of the method according to the invention;

Figure 1:
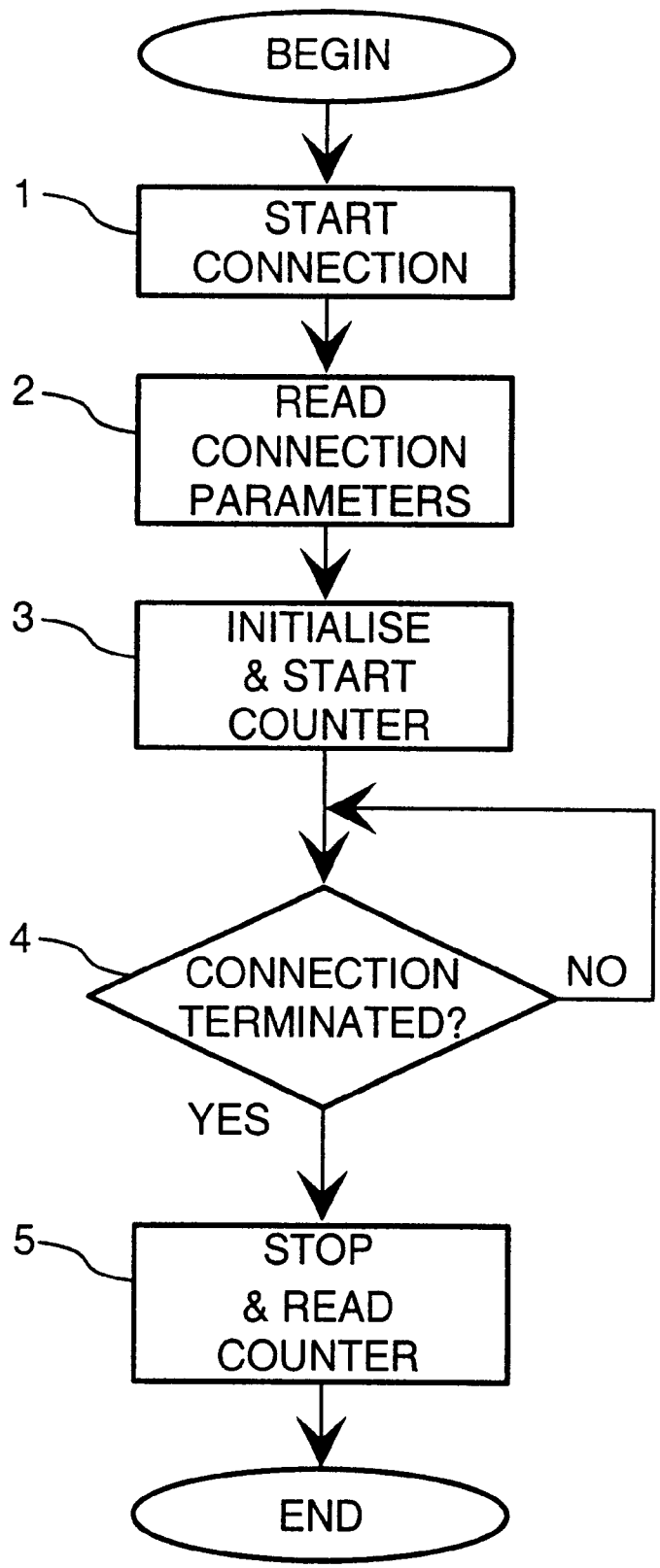

FIG. 1 shows in a flow diagram the steps of the method according to the invention. First the data transmission connection is established 1. Then the connection parameters are read 2, for instance the protocol of the automatic repeat request (ARQ), the quality of service of the network service (QoS), the bearer service type, the radio access network, the core network, the service provider, and the real-time/non real-time data. The counting of the data amount is initialised and started 3. The counting is initialized with zero, or with the amount of the payload data obtained earlier, in order to increase the value. The next step is to examine 4 whether the connection established above is disconnected. If the connection is continued there is a return to wait for disconnection 4, until the connection is disconnected and the process moves to the next step 5, where the counting is terminated and the result is read.

Figure 2:
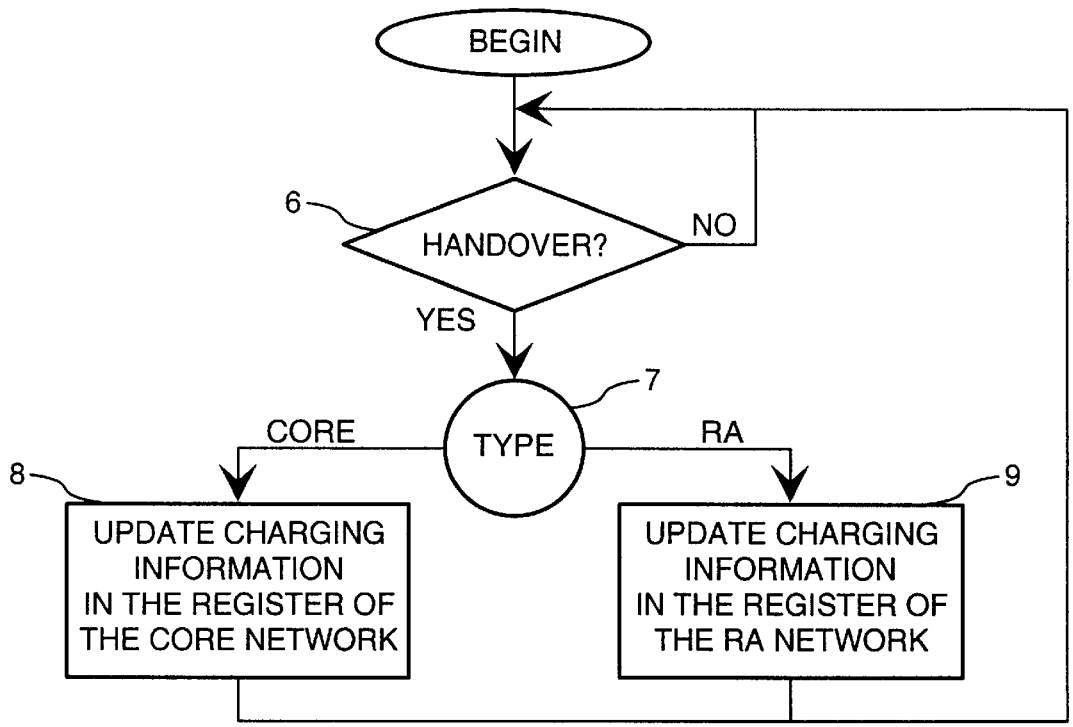
FIG. 2 shows in a flow diagram the steps of the method according to the invention during handover.

FIG. 2 shows in a flow diagram the handover of the method according to the invention. First there is examined 6 whether a handover situation is at hand, and if not, the process returns to the examination, until a handover is at hand. When the handover is executed 7 between core networks the charging information is updated 8 in the register of core networks, and when the handover is executed between radio access networks the charging information is updated 9 in the register of radio access networks. The process always returns to the step 6 when a register has been updated, and there the process waits for a handover.

Figure 3:
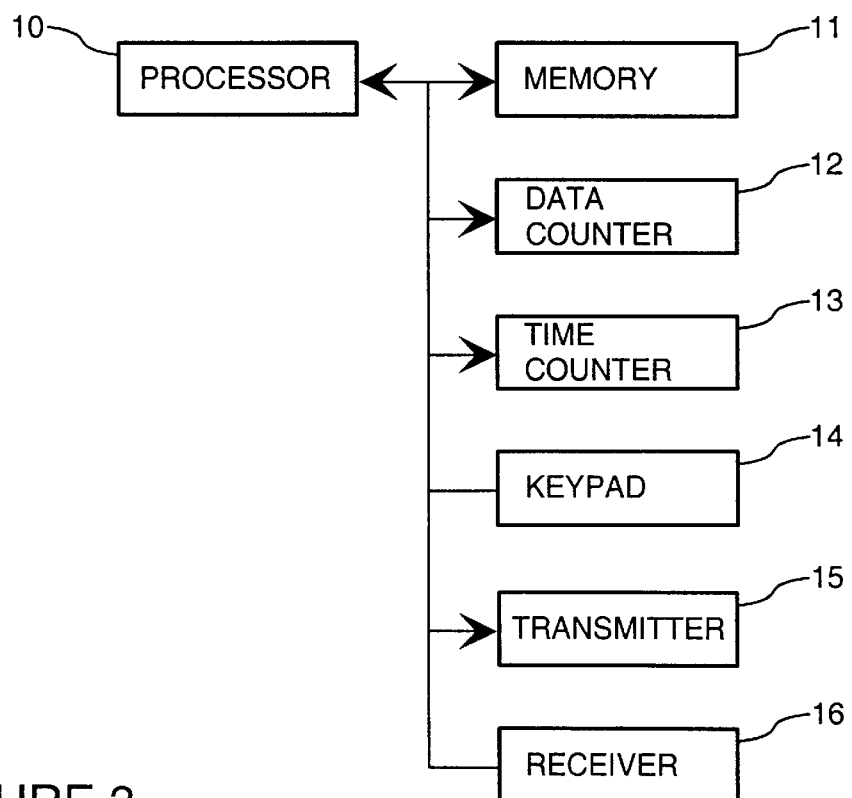
FIG. 3 shows in block diagram those components of a mobile station according to the invention which are essential regarding the invention.

FIG. 3 shows in block diagram those components of a mobile station according to the invention which are essential regarding the invention. The processor 10 runs the charging program from the memory 11, where it also stores the charging results. The data amounts transferred by the transmitter 15 and the receiver 16 are counted by the data counter 12, most preferably so that the counter registers each transferred payload data and adds the payload data which has passed through the transmitter 15 and through the receiver 16. This can be realized for instance so that always after a certain amount of data the transmitter 15 and the receiver 16 transmit an incrementing signal to the counter in order to increment its value by an amount corresponding to the unit of the data amount. A kilobyte (kB) is most preferably used as the unit of the data amount. The mobile station also comprises a time counter 13 for counting the call duration. The mobile station in general and its charging facilities are used via the keypad 14. The components of the mobile station are interconnected for instance via a data bus, such as the processor bus.

The processor is also supplied with information about the connection parameters, on the basis of which it classifies the charging. According to the invention these connection parameters include for instance the bearer type, the data transmission direction, the type of service (RT/NRT), the bit error rate (BER), the error correction (EC), and the automatic repeat request protocol.

Figure 4:
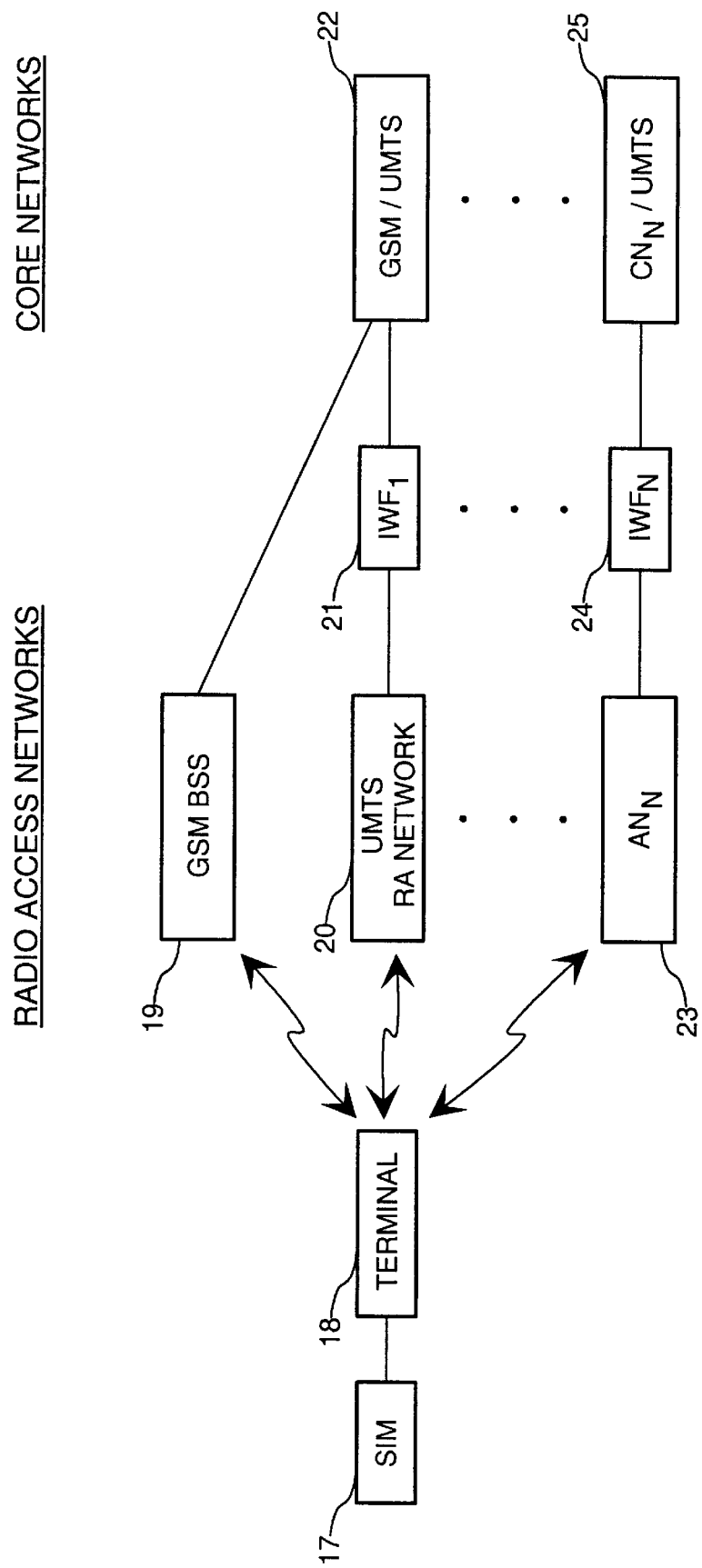
FIG. 4 shows in a block diagram the different components of a connection arrangement.

FIG. 4 shows in a block diagram the different components of a connection arrangement. The connection arrangement includes a plurality of core networks and correspondingly a plurality of radio access networks. The subscriber identity module (SIM) 17 is connected to a mobile station, in this case to the terminal 18, which has a radio connection to one of a plurality of optional radio access networks: GSM BSS (base station system) 19, UMTS radio access 20, or any other access network AN 23, of which there may be n networks, whereby the last of them is ANN. The GSM BSC 19 is directly connected to the GSM/UMTS core network 22, but there must be an interworking function (IWF) 21, 24 between the other radio access networks 20, 23 and the corresponding core networks 22, 25. The number of the required interworking functions 21, 24 is also n, whereby the functions are numbered $IWF_{1 \ldots N}$. The core networks are generally numbered $CN_{1 \ldots N}$.

As an example, let us discuss a situation in which the user has a high speed packet radio service connection with a duration of several hours, whereby he transmits only a few kilobytes of data compared to the use of a connection at the speed of 14.4 kbit/s lasting only a few seconds. The first connection transfers only the same amount of data as the last mentioned, even if the former connection can have a maximum available transmission rate which is tenfold compared to the latter. Therefore the charging of the latter connection is equally high as of the first one when it is measured only on the basis of the transferred amounts of payload data.

As a basis for the charging there are available the transferred data amounts of the GSM system (Groupe Special Mobile/Global System for Mobile communications), the High Speed Circuit Switched Data (HSCSD), the General Packet Radio Service (GPRS), and the third generation mobile telecommunications system. In these systems the transferred data amounts are most preferably counted on the second or third layer (Layer 2/3) of the seven layer structure of the Open Systems Interconnection (OSI) defined by International Standardization Organisation (ISO), for instance by the Logical Link Control (LLC). Then also other parameters, such as the quality of service (QoS), are of importance in the determination of the magnitude of the charging.

The invention can be used both in advanced mobile stations of the second and third generation as well as of future generations. In the advanced mobile stations of the second generation it is possible to use high speed circuit switched data transmission and general packet radio services. With mobile stations of the second generation we mean GSM devices. With mobile stations of the third generation we mean at least devices of the Universal Mobile Telecommunications System (UMTS) and/or devices of the International Mobile Telecommunications after year 2000 (IMT-2000).

In the UMTS system the transferred amount of data is most preferably counted in the LLC/RLC/MAC (Logical Link Control/Radio Link Control/Medium Access Control) protocols of the OSI Layer 2 (L2), but also in the Radio Resource Control (RRC) of the Layer 3 (L3).

The transferred data amounts are stored for instance in the memory of the mobile station or in its Subscriber Identity Module (SIM) or Used Identity Module (UIM). Possibly there is further also stored the starting date of the last calculation in order to know from which time on the information has been collected. This can be indicated for instance by a text of the following type: "107 megabytes of data has been transferred since Tuesday 14.4.1998; 9:00 o'clock"; in order to generate this at least a real-time clock and a large display are required. The stored data elements are for instance in accordance with the following structure:

| Field name | Form |
| --- | --- |
| Reset_Date | 31-12-9999 |
| Reset_Time | 23:59:59 |
| Tot_Cum_RT_Bearer_Type_1_UL | unsigned long integer |
| Tot_Cum_RT_Bearer_Type_1_DL | unsigned long integer |
| Last_Call_RT_Bearer_Type_1_UL | unsigned long integer |
| Last_Call_RT_Bearer_Type_1_DL | unsigned long integer |
| ... | ... |
| Tot_Cum_RT_Bearer_Type_n_UL | unsigned long integer |
| Tot_Cum_RT_Bearer_Type_n_DL | unsigned long integer |
| Last_Call_RT_Bearer_Type_n_UL | unsigned long integer |
| Last_Call_RT_Bearer_Type_n_DL | unsigned long integer |
| Tot_Cum_NRT_Bearer_Type_1_UL | unsigned long integer |
| Tot_Cum_NRT_Bearer_Type_1_DL | unsigned long integer |
| Last_Call_NRT_Bearer_Type_1_UL | unsigned long integer |
| Last_Call_NRT_Bearer_Type_1_DL | unsigned long integer |
| ... | ... |
| Tot_Cum_NRT_Bearer_Type_n_UL | unsigned long integer |
| Tot_Cum_NRT_Bearer_Type_n_DL | unsigned long integer |

-continued

| Field name | Form |
| --- | --- |
| Last_Call_NRT_Bearer_Type_n_UL | unsigned long integer |
| Last_Call_NRT_Bearer_Type_n_DL | unsigned long integer | in which file structure Tot means "total", Cum means "cumulative", RT is "Real-Time", NRT is "Non Real-Time", UL is "UpLink", and DL is "DownLink". On asymmetric connections transferred amounts are separated for the uplink and the downlink. The term "unsigned long integer" indicated for the form means a long integer without a sign, for which a wide Word or several Bytes are reserved in the memory.

In real-time services the types 1 to n of the table are used to differentiate for instance the time slots in the HSCSD system or the network service types in the UMTS system. The information is stored either as time units or data units. The amounts of data are most suitably used in the registering when a certain type of network has several user speeds charged differently. However, a simultaneous registering of both time units and data units is a better solution which offers more possibilities.

For instance, the Bearer_Type_1 parameter indicates a service using the time slot 1 in a telecommunications system of the TDMA type (Time Division Multiple Access), and the Bearer_Type_n parameter indicates the degree of symmetry of the link connection, which shows how large shares are assigned to the uplink and the downlink connections, respectively with Bearer_Type n_UL and Bearer_Type_n_DL. When the TDMA system is used the Bearer_Type_n parameter most preferably indicates the time slots to be used for the current uplink and downlink connections in the TDMA frame. Alternatively the parameter indicates only for instance the total number of time slots assigned to the uplink and downlink connections, without indicating the individual time slots. The Bearer_Type_n parameter is correspondingly used in a telecommunications system of the CDMA type (Code Division Multiple Access) in order to indicate the channel type, the allocations, and the degree of symmetry. Then a different number of spreading codes are allocated to the different types of service and/or the length of the spreading code is variable.

In non-real time services, such as in the GPRS and in the UMTS NRT system, there is made a similar classification, as there are for instance in the GPRS system four quality classes starting from Phase 1. Regarding the quality classes the charging is preferably made differently, so that the charge is higher for a higher quality class. Most preferably the registering is made by bytes, and the information is presented in suitable units, such as kilobytes or megabytes. Thus the registering is accurate and the information can be displayed to the user in the most suitable and informative form. The most suitable form can be selected automatically or by the user.

Data counters and/or time counters are used in order to realize the calculation, whereby these counters are incremented during the calls. Here a call means at least a voice call, a data call and/or a video call. One or more counters are allocated for the last mentioned calls, so that data about simultaneous calls can be registered. Also counters for the total call duration and/or the amount of the data can be used.

When the user sets the basic charge units it is possible to simply calculate an estimate for the bill with an algorithm formed by multiplication and addition operations. In principle the basic charge units can also be transferred via a radio connection.

A different number of auxiliary functions is required in order to transfer payload data in different classes; this is observed in the charges used for the different connection classes. Alternatively, it is also possible to use the total amount of data as the basis of the charging, whereby the total amount includes also the transmission bandwidth required by the auxiliary functions, such as error correction.

A mobile station can also have several simultaneous connections, which also have different classes. The transferred amounts of data can also be measured separately for different users, for instance so that the data is stored in identification units for each user which the users install in order to use the device. Most preferably the identification unit is a smart card, such as a SIM card. The smart card contains possibly information about several service providers, whereby a table for the service providers can be formed in the smart card for the charging data. Also these data are used as parameters of the charging when a service is provided by several providers, or when the core network is selected. Core networks or trunk networks are for instance the GSM, the DCS 1800, and the future UMTS networks. The radio access network, i.e. the standard of the air interface, has also an impact on the charging. For instance an access network GSM BSS (Base Station System) of the GSM system is connected to the UMTS core network, whereby the access network has an effect on the charging. The access network of a third generation mobile telephone network, such as the UMTS network, can also be connected to the core network of a second generation mobile telephone network, such as the GSM.

Future mobile stations are terminals which contain more and more functions (multimode terminals), whereby a single terminal operates for instance in the GSM and in the DCS 1800 (Digital Cellular System) systems or in the GSM and in the UMTS systems. Then according to the invention the charging is determined on the basis of the core network, whereby the charging usually is different for the different core networks.

Let us briefly discuss as an example a situation where according to the invention it is possible to give an alarm from the mobile station to the user during a handover of the core system. The handover is made for instance from a base station of the GSM system to a base station of the UMTS system. Correspondingly, during the handover the charging data is determined to be transferred to the smart card or into the device's memory, according to the core system. The transmission system is a core network or a radio access network.

Let us briefly discuss as another example a situation where according to the invention a mobile station transfers charging information to two different locations during a handover of the core network. In this case these locations are a register of the service provider and the memory or the smart card of the mobile station, whereby this location contains separate registers for each network. Thus the charging information of a single connection or service can also be collected in several different registers. Thus according to the invention it is possible to realize a more flexible itemized charging than at present.

In UMTS the measurement of the data amounts is most suitably centralized at the second level of the OSI model of ISO, which can be seen in the following table

| |
|---|
| LAC |
| RLC/MAC | where LAC is the Link Access Control, RLC is the Radio Link Control, and MAC is the Media Access Control. The lower part can alternatively contain a third control protocol. The gross data amount, which means all transferred data, is most preferably counted on this second level. The net data amount, which means the user information and alternatively also signalling on the control level, which is liable to charges, is possibly counted in the upper part of this level, or on the application/TCP level (Transmission Control Protocol). The counting of the net data amount on the application/TCP level may be the best way, because the data is transferred in a Protocol Data Unit (PDU), which contains a header requiring extra space.

The invention can also be used in other wireless systems in addition to the cellular mobile telecommunications systems; such wireless systems are for instance the wireless Asynchronous Transfer Mode (ATM), the Low Power Radio Frequency (LPRF) and the Hiperlan of the fourth generation.

The invention is not limited to apply only to the above presented embodiment examples, but many modifications are possible within the inventive idea defined by the claims.

What is claimed is:

1. A method for determining charging information in a mobile communications system comprising one or more mobile stations and a mobile telecommunications network, comprising the steps of:

collecting information about a call in the system, comprising:

the amount of transferred payload data, and the bearer type and the symmetry of the connection, and using said information to determine a bill which is proportional to the amount of transferred payload data.

2. A method according to claim 1, wherein the bill is also determined on the basis of at least one of the following parameters: quality of service (Qos), core network, and radio access network.

3. A method according to claim 1, wherein the bill is also determined on the basis of at least one of the following parameters: a handover to a base station in a different core network, and a handover to a base station in a different radio access network.

4. A method according to claim 1, wherein the information is collected in a mobile station.

5. A method according to claim 1, wherein the information is collected in the mobile telecommunications network.

6. A method according to claim 1, wherein information is collected separately about transmitted payload data and/or received payload data.

7. A method according to claim 1, wherein information is also collected about call duration.

8. A method according to claim 1, wherein the transferred payload data is classified in classes having different characteristics.

9. A method according to claim 1, wherein the charging information is stored relating to each call.

10. A method according to claim 1, wherein the charging information is stored by classes.

11. A method according to claim 1, wherein the charging information can be displayed to a user on a display of a mobile station.

12. A mobile station which collects charging information for billing a user, wherein the mobile station comprises:

a transmitter and a receiver for transferring information, a payload data counter for counting and providing measurement information about data transferred by the transmitter or the receiver, a processor for collecting charging information based on the measurement information provided by the payload data counter, and the bearer type and the symmetry of the connection, and a memory for storing the charging information for billing a user and a program of the processor.

13. A mobile station according to claim 12, further comprising a time counter for determining call duration.

14. A mobile telecommunications system, comprising a transmitter and a receiver for transferring information, a payload data counter for counting and providing measurement information about data transferred by the transmitter or the receiver, a processor for collecting charging information based on the measurement information provided by the payload data counter, and the bearer type and the symmetry of the connection, and a memory for storing the charging information for billing and a program of the processor.

* * * * *